Patented Apr. 16, 1940

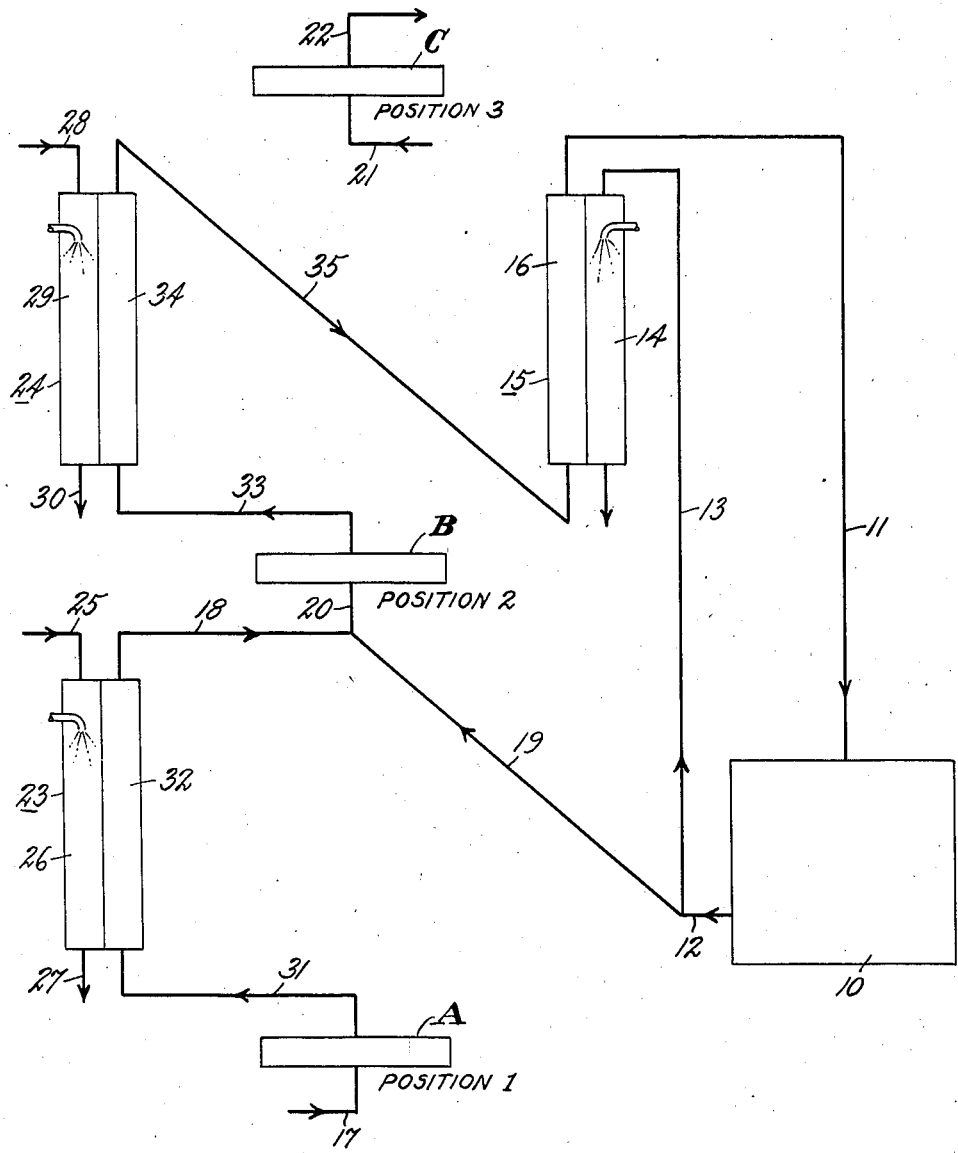

2,197,203

UNITED STATES PATENT OFFICE 2,197,203

AIR TREATMENT

Ralph M. Buffington, Evansville, Ind., assignor to Servel, Inc., New York, N. Y., a corporation of Delaware Application December 14, 1937, Serial No. 179,637

3 Claims. (Cl. 62—139)

My invention relates to dehydration of air by absorption and it is an object of the invention to carry out this process at greater efficiency.

The drawing shows diagrammatically an air treating system embodying the invention. In this system, air is dried by an absorbent such as silica gel, activated aluminum, or the like, and cooled by water.

Conditioned air enters a room 10 through a conduit 11 and air is withdrawn from room 10 by way of a conduit 12. Part of the withdrawn air is conducted to exhaust through a conduit 13 and a wet passage 14 of a heat exchanger 15. Water is sprayed into air in passage 14 for evaporative cooling, for instance, as described in an application Serial No. 625,936 of B. C. Shipman. Air supplied to room 10 first passes through the other or dry passage 16 of heat exchanger 15. Air in dry passage 16 is cooled by heat transfer to air in wet passage 14. The part of the process just described may be referred to as regenerative evaporative air cooling and 15 is a regenerative evaporative heat exchanger.

The other part of the air withdrawn from room 10 through conduit 12 is mixed with fresh or makeup air and passed again through heat exchanger 15 to the room. When the moisture content of atmospheric air is above that desired in room 10, dehydration may be carried out by absorbents, which term includes adsorbents. It is known to mix fresh air with recirculated air and pass the mixture through an absorber or a series of absorbers. The fresh air carries most of the moisture to be removed. I therefore separately dry the makeup air before mixing with recirculated air and then further dry the mixture in another absorber stage. The result is that delivered air is drier and the absorption ratio is improved, which improves the thermal efficiency.

In the system diagram, there are represented three absorbers of any suitable type. Absorber A receives fresh air through conduit 17. Absorber B receives makeup air through conduit 18 and air from the room through conduit 19, the makeup air and recirculation air mixing in conduit 20. Absorber C is being regenerated or dried, for instance, by flow of hot flue gas from a gas burner, the hot gas flowing to the absorber through conduit 21 and exhausting through conduit 22.

Makeup air flowing from absorber A to absorber B is cooled by an evaporative heat exchanger 23, and the air flowing from absorber B is cooled by an evaporative heat exchanger 24 before entering the regenerative heat exchanger 15. Outdoor air flows through a conduit 25 to the wet passage 26 of exchanger 23 and thence through conduit 27 to exhaust. Outdoor air also flows through a conduit 28 to the wet passage 29 of exchanger 24 and thence through conduit 30 to exhaust.

Air from absorber A flows through a conduit 31 to the dry passage 32 of exchanger B. Air from absorber B flows through conduit 33 to the dry passage 34 of exchanger 24, and thence through conduit 35 to the dry passage 16 of the regenerative exchanger 15. Air in exchangers 23 and 24 is cooled toward the wet bulb temperature of atmospheric air, and air in exchanger 15 is cooled toward the wet bulb temperature of room air.

The described connections of absorbers A, B, and C are indicated generally on the diagram as absorber positions 1, 2, and 3 respectively. In carrying out the process the absorbers are changed in rotation from one position to the next in the direction 3—2—1—3— etc. When the above described process has been in progress during a certain period of time, absorber A is substituted for absorber C in position 1, absorber C replaces absorber B in position 2, and absorber B takes the place of absorber A in position 3. Absorbers A, B, and C may be separate absorbers or parts of one absorber. The connections may be changed in known manner by dampers or rotation of the absorbers or absorber bed.

What is claimed is:

1. Air treatment which includes circulating air in a certain circuit including a room to be conditioned, forming a stream of atmospheric or make-up air, withdrawing a fraction of the circulating air, replacing said fraction with air from said stream of make-up air, dehydrating air by bringing an absorbent first in contact with air in said circuit and then in contact with air in said stream, cooling air in said stream by evaporation of water in the presence of atmospheric air outside of said stream, and cooling air in said circuit first by evaporation of water in the presence of atmospheric air and then by evaporation of the water in the presence of said withdrawn air.

2. An air conditioning system having a circuit for air including a room and a place of absorption and in which air is circulated from the room to said place of absorption and then back to the room, a conduit for conducting atmospheric or make-up air to said circuit to join circulating air flowing from the room to said place of absorption, a conduit for withdrawing a fraction of the air in said circuit flowing from the room, a second place of absorption in said make-up air conduit, a heat exchanger utilizing evaporation of water in the presence of atmospheric air for cooling air in said circuit flowing from said first place of absorption to said room, and a heat exchanger utilizing evaporation of water in the presence of air in said withdrawing conduit for cooling air in said circuit flowing from said first heat exchanger to said room.

3. An air conditioning system having a circuit for air including a room and a place of absorption and in which air is circulated from the room to said place of absorption and then back to the room, a conduit for conducting atmospheric or make-up air to said circuit to join circulating air flowing from the room to said place of absorption, a conduit for withdrawing a fraction of the air in said circuit flowing from the room, a second place of absorption in said make-up air conduit, a heat exchanger utilizing evaporation of water in the presence of atmospheric air for cooling air in said circuit flowing from said first place of absorption to said room, a heat exchanger utilizing evaporation of water in the presence of air in said withdrawing conduit for cooling air in said circuit flowing from said first heat exchanger to said room, and a heat exchanger utilizing evaporation of water in the presence of atmospheric air for cooling air in said make-up conduit.

RALPH M. BUFFINGTON.